(12) United States Patent
Awano

(10) Patent No.: US 8,257,847 B2
(45) Date of Patent: Sep. 4, 2012

(54) LITHIUM SECONDARY BATTERY

(75) Inventor: Hiroki Awano, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 779 days.

(21) Appl. No.: 12/307,589

(22) PCT Filed: Jul. 18, 2007

(86) PCT No.: PCT/JP2007/064210
§ 371 (c)(1),
(2), (4) Date: Jan. 6, 2009

(87) PCT Pub. No.: WO2008/010530
PCT Pub. Date: Jan. 24, 2008

(65) Prior Publication Data
US 2009/0286139 A1    Nov. 19, 2009

(30) Foreign Application Priority Data
Jul. 19, 2006   (JP) ................................. 2006-197399

(51) Int. Cl.
*H01M 2/12* (2006.01)
(52) U.S. Cl. .......... 429/53; 429/129; 429/221; 429/223; 429/224; 429/231.5; 429/231.1; 429/231.2; 429/231.3
(58) Field of Classification Search .............. 429/53, 429/54, 56, 231.95, 129, 221, 223, 224, 231.5, 429/231.1, 231.2, 231.3
See application file for complete search history.

(56) References Cited

U.S. PATENT DOCUMENTS

| | | | |
|---|---|---|---|
| 2004/0157114 A1* | 8/2004 | Arakawa | 429/53 |
| 2006/0177742 A1 | 8/2006 | Abe et al. | |
| 2008/0003503 A1* | 1/2008 | Kawakami et al. | 429/231.95 |

FOREIGN PATENT DOCUMENTS

| | | |
|---|---|---|
| EP | 1 049 189 | 11/2000 |
| JP | 10-199505 | 7/1998 |
| JP | 2002-216755 | 8/2002 |
| JP | 2002-216770 | 8/2002 |
| JP | 2002-231223 | 8/2002 |
| JP | 2002-260722 | 9/2002 |
| JP | 2002-279989 | 9/2002 |
| JP | 2003-229122 | 8/2003 |
| JP | 2006-147287 | 6/2006 |
| KR | 10-2006-0035767 | 4/2006 |

* cited by examiner

*Primary Examiner* — Laura Weiner
(74) *Attorney, Agent, or Firm* — Finnegan, Henderson, Farabow, Garrett & Dunner, LLP

(57) ABSTRACT

A main object of the present invention is to provide a lithium secondary battery whose potential can be rapidly increased immediately after the start of overcharge, thereby terminating charging before a safety valve is actuated. This object can be solved by a lithium secondary battery comprising: a cathode having a phosphate compound of olivine structure as a cathode active material, an anode, a separator sandwiched between the cathode and the anode, an electrolyte comprising a supporting salt dissolved therein, and a safety valve having a valve-opening pressure within the range of 25 kgf/cm$^2$ to 30 kgf/cm$^2$, wherein assuming that the initial amount of Li contained in the cathode is 100, the initial amount of Li contained in the electrolyte is within the range of 5 to 20.

2 Claims, 2 Drawing Sheets

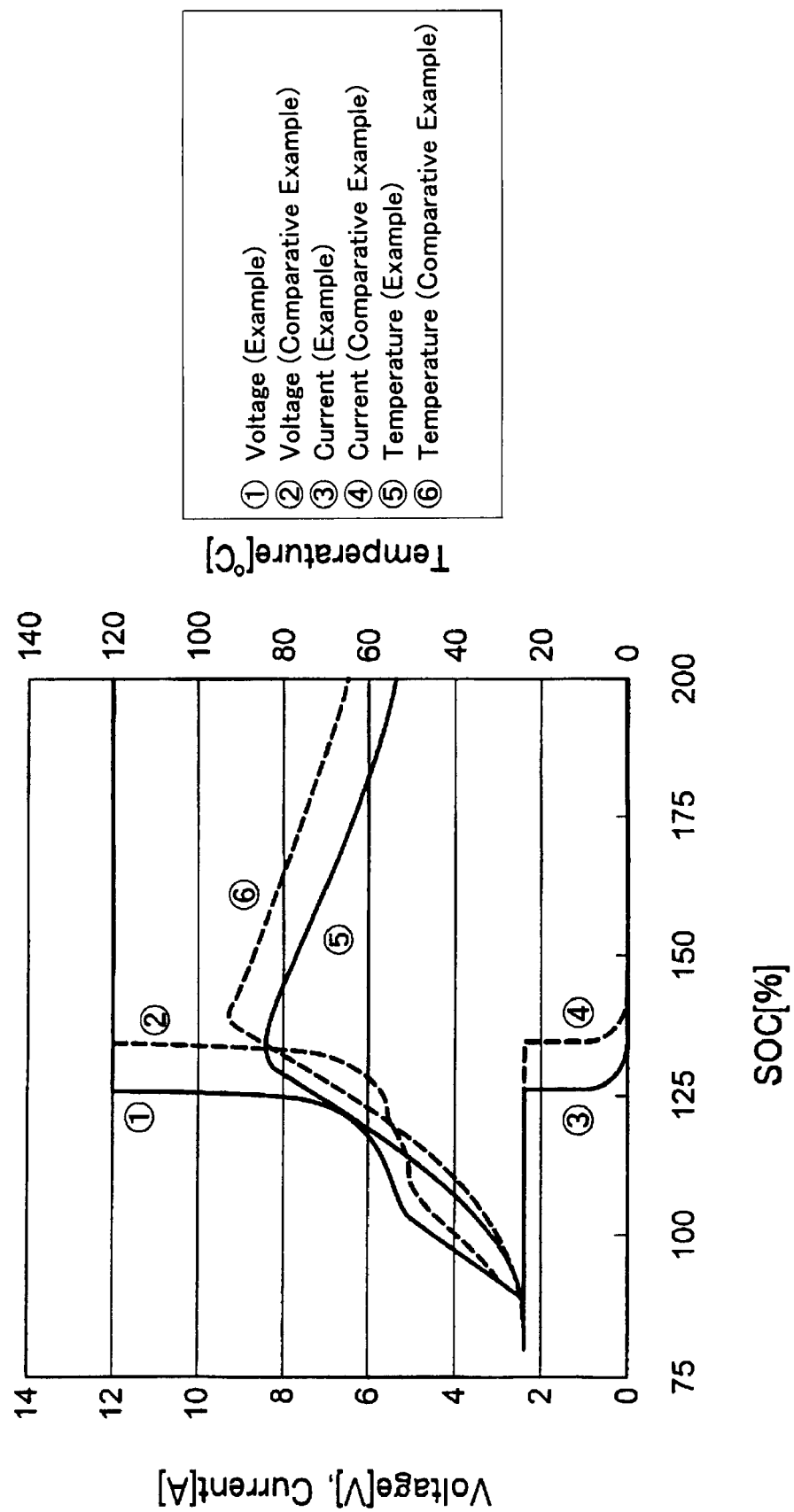

LITHIUM SECONDARY BATTERY

CROSS-REFERENCE TO RELATED APPLICATIONS

This application is a national phase application of International Application No. PCT/JP2007/064210, filed Jul. 18, 2007, and claims the priority of Japanese Application No. 2006-197399, filed Jul. 19, 2006, the contents of both of which are incorporated herein by reference.

TECHNICAL FIELD

The present invention relates to a lithium secondary battery which can detect an overcharged state instantly to terminate charging before a safety valve operates.

BACKGROUND ART

As devices such as personal computers, video cameras, and cell phones are downsized in the fields of information-related devices and communication devices, lithium secondary batteries have been practically and widely used as power sources in these devices because of high energy density. Meanwhile, in the field of automobiles, there is demands for urgent development of electric vehicles, because of environmental and resources problems, and lithium secondary batteries have also been examined as power sources for such electric vehicles.

The lithium secondary battery uses chemically highly active lithium, a highly combustible electrolyte, and a cathode active oxide material poor in thermal stability in a charged state, and thus the battery should be handled with great care. Particularly, one of main advantages of the lithium secondary battery is the ability of the battery to be repeatedly discharged and charged, thus requiring intensive countermeasures against improper use during charging, specifically against overcharging. It is known that generally when a lithium secondary battery remains overcharged, a decomposed gas of an electrolyte is generated once the potential of a cathode exceeds the decomposition potential of the electrolyte, and as the gas is generated, the internal pressure of the battery is increased. Accordingly, there is demands for a lithium secondary battery that can detect an overcharged state instantly.

Patent Document 1 discloses a nonaqueous-electrolyte secondary battery wherein a conductivity regulating material with electric conductivity varying significantly by doping/dedoping is added to a cathode active material having a phosphate compound of olivine structure. This secondary battery, when overcharged, interrupts current by a drop in the electric conductivity of the conductivity regulating material Patent Document 2, on the one hand, discloses a battery having a layer of an electroconductive polymer formed between a cathode layer and a cathode current collector layer. In this battery, the electroconductive polymer upon malfunction such as overcurrent or overvoltage has increased resistance with which the battery circuit is interrupted. However, these batteries mentioned above use an electroconductive polymer etc., so there are problems such as an increase in costs and in the number of steps for production.

Patent Document 1: Japanese Patent Application Laid-Open (JP-A) No. 2002-216770

Patent Document 2: JP-A No. 10-199505

DISCLOSURE OF INVENTION

Problem to be Solved by the Invention

The present invention has been completed in view of the problems described above, and a main object of the present invention is to provide a lithium secondary battery capable of detecting an overcharged state instantly.

Means for Solving the Problems

To solve the problems, the present invention provides a lithium secondary battery comprising: a cathode having a phosphate compound of olivine structure as a cathode active material, an anode, a separator sandwiched between the cathode and the anode, an electrolyte comprising a supporting salt dissolved therein, and a safety valve having a valve-opening pressure within the range of 25 kgf/cm$^2$ to 30 kgf/cm$^2$, wherein assuming that an initial amount of Li contained in the cathode is 100, an initial amount of Li contained in the electrolyte is within the range of 5 to 20.

According to the present invention, the battery, when overcharged, can rapidly increase its potential by using a phosphate compound of olivine structure as a cathode active material, thereby detecting an overcharged state instantly before a safety valve operates.

In the present invention, a concentration of the supporting salt contained in the electrolyte is preferably within the range of 0.5 mol/L to 1 mol/L. This is because: when the concentration of the supporting salt is too low, a sufficient current density cannot be attained; while when the concentration of the supporting salt is too high, the electrolyte is hardly depleted of Li, thereby delaying the timing of increase in the potential, which can cause the internal pressure of the battery to be increased to actuate a safety valve.

Effect of the Invention

In the present invention, an effect of providing a highly safe lithium secondary battery can be attained.

BRIEF DESCRIPTION OF DRAWINGS

FIG. 2 is a graph showing the results in the Example and Comparative Example.

BEST MODE FOR CARRYING OUT THE INVENTION

Figure 1:
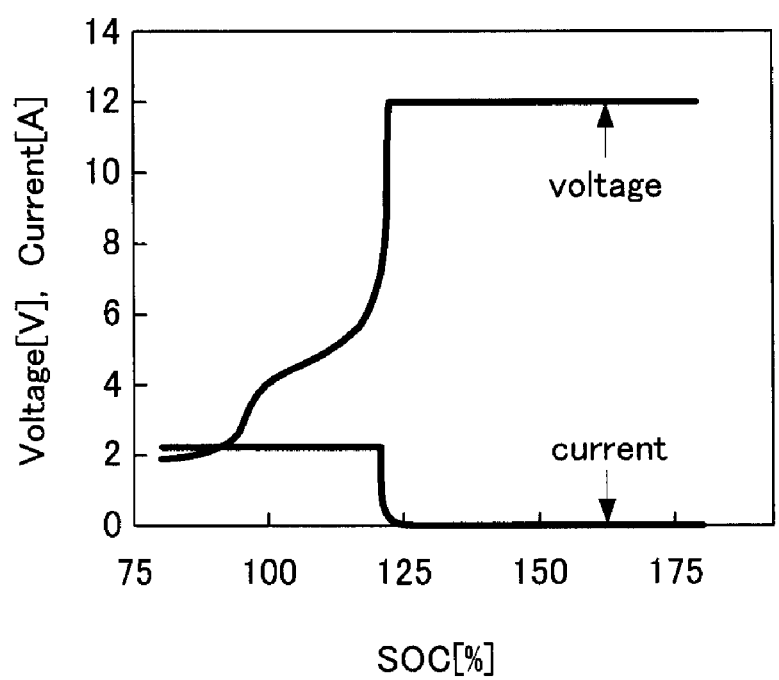
FIG. 1 is a graph showing the behavior of the lithium secondary battery of the present invention in an overcharged state.

Hereinafter, the lithium secondary battery of the present invention is described in detail.

The lithium secondary battery of the present invention comprises: a cathode having a phosphate compound of olivine structure as a cathode active material, an anode, a separator sandwiched between the cathode and the anode, an electrolyte comprising a supporting salt dissolved therein, and a safety valve having a valve-opening pressure within the range of 25 kgf/cm$^2$ to 30 kgf/cm$^2$, wherein assuming that the initial amount of Li contained in the cathode is 100, the initial amount of Li contained in the electrolyte is within the range of 5 to 20.

According to the present invention, the battery when overcharged can rapidly increase its potential by using a phosphate compound of olivine structure as a cathode active material, thereby detecting an overcharged state instantly before a safety valve operates. Further, the concentration of the supporting salt in the electrolyte is set relatively low so that the electrolyte is depleted early of Li, thereby quickening the timing of increasing the potential, to terminate charging before the internal pressure of the battery becomes too great. As a result, charging can be terminated without actuating the safety valve having the valve-opening pressure described above, thus making the lithium secondary battery highly safe.

In the present invention, the potential of the battery when overcharged is rapidly increased by using a phosphate compound of olivine structure as a cathode active material, and this phenomenon is considered attributable to the property of the phosphate compound of olivine structure that allows the phosphate compound in 100% SOC (state of charge) to hardly have Li in it. That is, there seems to appear a phenomenon in which the cathode is depleted of Li immediately after the start of overcharge, and then the electrolyte is also depleted of Li, thereby increasing the internal resistance of the battery, resulting in a rapid increase in the potential of the battery.

Now, the behavior of the lithium secondary battery of the present invention in an overcharged state is described by reference to the drawings. The potential of the lithium secondary battery of the present invention is rapidly increased when the battery becomes overcharged. Specifically, as shown in FIG. 1, the potential is rapidly increased in the vicinity of 125% SOC, to promptly reach the maximum potential (12 V in FIG. 1), so that charging can be terminated before the internal pressure of the battery becomes too great, thus making the lithium secondary battery highly safe.

Hereinafter, each constitution of the lithium secondary battery of the present invention is described in detail.

1. Cathode and Anode

First, the cathode and the anode used in the present invention are described. The cathode used in the present invention has a phosphate compound of olivine structure as a cathode active material. The cathode used in the present invention is composed usually of a cathode layer and a cathode current collector, and the cathode layer contains a cathode active material, a binder and if necessary a conductive material.

The phosphate compound of olivine structure used as the cathode active material is not particularly limited as long as the potential is rapidly increased in an overcharged state.

Specific examples of the phosphate compound include $LiM_xFe_{1-x}PO_4$ ($0 \leq x \leq 0.5$), $LiM_xCo_{1-x}PO_4$ ($0 \leq x \leq 0.5$), $LiM_xNi_{1-x}PO_4$ ($0 \leq x \leq 0.5$), $LiM_xMn_{1-x}PO_4$ ($0 \leq x \leq 0.5$), and $LiM_xV_{1.5-x}PO_4$ ($0 \leq x \leq 0.75$), among which $LiM_xFe_{1-x}PO_4$ ($0 \leq x \leq 0.5$) is preferable. In the above, "M" represents at least one member selected from Fe, Co, Ni, Mn and V.

In the present invention, the cathode active material is identified by X-ray diffraction as a phosphate compound of olivine structure.

In the present invention, the amount of the phosphate compound of olivine structure contained in the cathode layer is not particularly limited as long as the potential can be rapidly increased in an overcharged state. Usually, the amount of the phosphate compound is preferably within the range of 70 to 95% by weight, more preferably within the range of 75 to 95% by weight, even more preferably within 80 to 90% by weight.

The binder used is not particularly limited and may be the same binder as used in general lithium secondary batteries. Specific examples include polyvinylidene fluoride (PVDF), and polytetrafluoroethylene (PTFE).

The conductive material used is not particularly limited and may be the same conductive material as used in general lithium secondary batteries. Specific examples include carbon substances such as carbon black, acetylene black, and graphite.

The cathode current collector used is not particularly limited and may be the same cathode current collector as used in general lithium secondary batteries. Specific examples include foils manufactured in the form of plates from metals such as aluminum, and stainless steel.

On the other hand, the anode used in the present invention is composed usually of an anode layer and an anode current collector, and the anode layer contains an anode active material, a binder, and if necessary a conductive material.

The anode active material is not particularly limited as long as Li ions can be intercalated and desorbed at a lower potential than the cathode active material does. Examples include $Li_4Ti_5O_{12}$, Sn, Si, metal Li, and carbon materials such as graphite.

The types of the binder, the conductive material etc. that can be used in the anode layer are the same as used in the cathode layer described above, and thus their descriptions are omitted.

The anode current collector is not particularly limited and may be the same anode current collector as used in general lithium secondary batteries. Specific examples include foils manufactured in the form of plates from metals such as copper, nickel.

The method used to produce the cathode and anode usually includes a method that comprises preparing a paste having an active material, a binder, a conductive material etc. dissolved and dispersed in a suitable solvent, applying the paste onto a current collector, and drying it.

2. Electrolyte

Now, the electrolyte used in the present invention is described. The electrolyte used in the present invention usually has a Li-containing supporting salt and a solvent for dissolving the supporting salt. In the present invention, one feature of the electrolyte is that assuming that the initial amount of Li contained in the cathode is 100, the initial amount of Li contained in the electrolyte is within the range of 5 to 20. In the present invention, it is preferable that, assuming that the initial amount of Li contained in the cathode is 100, the initial amount of Li contained in the electrolyte is within the range of 5 to 15, particularly within the range of 5 to 10. When the initial amount of Li contained in the electrolyte is too low, a sufficient current density cannot be attained, while when the initial amount of Li contained in the electrolyte is too high, the electrolyte is hardly depleted of Li, thereby delaying the timing of increasing the potential, which can cause the internal pressure of the battery to be increased to actuate a safety valve.

The "initial amount of Li contained in the cathode" refers to the amount of Li possessed by the cathode just before the lithium secondary battery is assembled. This value can be calculated from a chemical composition of the cathode active material and the amount of the active material used. On the other hand, the "initial amount of Li contained in the electrolyte" refers to the amount of Li possessed by the electrolyte just before the lithium secondary battery is assembled. This value can be calculated from the concentration of Li ions, the weight of the electrolyte, and the specific gravity of the electrolyte.

The concentration of the supporting salt contained in the electrolyte is not particularly limited. For example, the concentration is preferably within the range of 0.5 mol/L to 1.0 mol/L, more preferably within the range of 0.5 mol/L to 0.75 mol/L. This is because: when the concentration of the supporting salt is too low, a sufficient current density cannot be attained; while when the concentration of the supporting salt is too high, the electrolyte is hardly depleted of Li, thereby delaying the timing of increasing the potential, which can cause the internal pressure of the battery to be increased to actuate a safety valve.

The type and other factors of the supporting salt and solvent used in the present invention can be the same as in general lithium secondary batteries and are not particularly limited.

Specific examples of the supporting salt include $LiPF_6$, LiTFSI (lithium bis(trifluoromethanesulfonyl)imide), and $LiBF_4$. Examples of the solvent include EC (ethylene carbonate), DMC (dimethyl carbonate), DEC (diethyl carbonate), DMC (dimethyl carbonate), and mixtures thereof.

3. Safety Valve

Now, the safety valve used in the present invention is described. One feature of the safety value used in the present invention is that the valve-opening pressure is within the range of 25 kgf/cm² to 30 kgf/cm². The safety valve used in the present invention is not particularly limited as long as it is a type of detecting an abnormal pressure to open the valve thereby reducing the internal pressure of the battery, and the valve-opening pressure is in the above range.

4. Separator

Now, the separator used in the present invention is described. The separator used in the present invention is not particularly limited as long as it functions in separating the cathode and anode from each other and in keeping the electrolyte. Specific examples include porous membranes of polyethylene, and polypropylene.

5. Lithium Secondary Battery

The shape of the lithium secondary battery of the present invention is not particularly limited, and is specifically in the from of a cylinder, a coin, a laminate or the like, preferably in the form of a cylinder. The lithium secondary battery in the form of a cylinder specifically includes 18650 type (diameter 18 mm, height 65 mm), and 17670 type (diameter 17 mm, height 67 mm), among which 18650 type is preferable.

In FIG. 1, the battery was restored to its normal state when the potential reached 12 V. Such maximum potential is usually within the range of 10 V to 20 V.

The present invention is not limited to the above-described embodiments. The above embodiments are mere illustrative, and the present invention encompasses any embodiments that have substantially the same constitution and exhibit the same working effect as by the technical idea described in the claims in the present application.

EXAMPLES

Hereinafter, the present invention is described in more detail by reference to the Examples.

Example 1

Preparation of a Cathode

Introduced were 85 g of lithium iron phosphate ($LiFePO_4$) powder as a cathode active material and 10 g of carbon black as a conductive material into 125 mL of a solution containing 5 g of polyvinylidene fluoride (PVDF) as a binder dissolved in n-methylpyrrolidone as a solvent, and then kneaded until the mixture was uniformly mixed to prepare a paste. Then, this paste was applied onto both sides of an Al current collector foil of 15 μm in thickness and then dried to prepare an electrode. The amount of the paste applied onto the electrode was 12 mg/cm² (one side: 6 mg/cm²). Then, this electrode was pressed such that the paste became 70 μm in thickness and 1.7 g/cm³ in density. Thereafter, this electrode was cut into a cathode, the coated portion of which was 52 mm in width and 680 mm in length.

(Preparation of an Anode)

Introduced were 85 g of lithium titanate ($Li_4Ti_5O_{12}$) powder as an anode active material and 10 g of carbon black as a conductive material into 125 mL of a solution containing 5 g of polyvinylidene fluoride (PVDF) as a binder dissolved in n-methylpyrrolidone as a solvent, and then kneaded until the mixture was uniformly mixed to prepare a paste. Then, this paste was applied onto both sides of an Al current collector foil of 15 μm in thickness and then dried to prepare an electrode. The amount of the paste applied onto the electrode was 14 mg/cm² (one side: 7 mg/cm²). Then, this electrode was pressed such that the paste became 90 μm in thickness and 1.6 g/cm³ in density. Thereafter, this electrode was cut into an anode, the coated portion of which was 55 mm in width and 720 mm in length.

(Preparation of a Battery)

A lead was welded to the cathode and the anode respectively, and a polyethylene porous film of 25 μm was arranged between the cathode and anode and wound as a separator. This wound product was held in an 18650 battery can, and the anode lead was welded to the can, and the cathode lead was welded to the cap. Then, an electrolyte was injected into the electrode and separator in the 18650 can. The electrolyte used was a mixture prepared by mixing lithium hexafluorophosphate ($LiPF_6$) as a supporting salt at a concentration of 0.75 mol/L with a mixture of EC (ethylene carbonate), DMC (dimethyl carbonate) and EMC (ethyl methyl carbonate) in a volume ratio of 3:3:4. Finally, the can was caulked and sealed with the cap, thereby producing a lithium secondary battery. Assuming that the initial amount of Li in the cathode is 100, the initial amount of Li contained in the electrolyte was 15. The valve-opening pressure of a safety valve arranged in the lithium secondary battery was 25 kgf/cm².

Comparative Example 1

A lithium secondary battery was obtained in the same manner as in Example 1 except that the concentration of lithium hexafluorophosphate ($LiPF_6$) used as a supporting salt was 1.0 mol/L. Assuming that the initial amount of Li contained in the cathode is 100, the initial amount of Li contained in the electrolyte was 22.

[Results]

The voltage, current and temperature of the battery in an overcharged state in Example 1 and Comparative Example 1 are shown in FIG. 2.

Overcharge Test Conditions:

(1) When the battery voltage reached 12 V, the charging current was restored to its normal state.

(2) The current was 5 C (2.5 A).

As a result, the voltage in both the batteries was reached 12 V upon which the charging current was restored to its normal state. By then, the valve was actuated in Comparative Example 1, while in Example 1, the potential was rapidly increased in earlier SOC (state of charge) than in the Comparative Example, to reach 12 V upon which the charging current was restored to its normal state, during which the valve was not actuated, and thus the battery in Example 1 was confirmed to have improved safety.

The invention claimed is:

1. A lithium secondary battery comprising:
   a cathode having a phosphate compound of olivine structure having a formula selected from $LiM_xFe_{1-x}PO_4$ ($0 \leq x \leq 0.5$), $LiM_xCo_{1-x}PO_4$ ($0 \leq x \leq 0.5$), $LiM_xNi_{1-x}PO_4$ ($0 \leq x \leq 0.5$), $LiM_xMn_{1-x}PO_4$ ($0 \leq x \leq 0.5$), and $LiM_xV_{1.5-x}PO_4$ ($0 \leq x \leq 0.75$) as a cathode active material, wherein when x does not equal 0, M is at least one member selected from Fe, Co, Ni, Mn, and V, an anode, a separator sandwiched between the cathode and the anode, an electrolyte comprising a supporting salt dissolved therein, and a safety valve having a valve-opening pressure within the range of 25 kgf/cm$^2$ to 30 kgf/cm$^2$, wherein, assuming that an initial amount of Li contained in the cathode is 100, an initial amount of Li contained in the electrolyte is within the range of 5 to 20.

2. The lithium secondary battery according to claim 1, wherein a concentration of the supporting salt contained in the electrolyte is within the range of 0.5 mol/L to 1 mol/L.

* * * * *